(12) United States Patent
Shono et al.

(10) Patent No.: US 11,384,309 B2
(45) Date of Patent: Jul. 12, 2022

(54) REFRIGERATOR OIL AND HYDRAULIC FLUID COMPOSITION FOR REFRIGERATORS

(71) Applicant: ENEOS Corporation, Tokyo (JP)

(72) Inventors: Yohei Shono, Tokyo (JP); Fumiyuki Nara, Tokyo (JP); Takeshi Okido, Tokyo (JP); Hidetoshi Ogata, Tokyo (JP)

(73) Assignee: ENEOS CORPORATION, Tokyo (JP)

(*) Notice: Subject to any disclaimer, the term of this patent is extended or adjusted under 35 U.S.C. 154(b) by 0 days.

(21) Appl. No.: 16/967,242

(22) PCT Filed: Feb. 6, 2019

(86) PCT No.: PCT/JP2019/004261
§ 371 (c)(1),
(2) Date: Aug. 4, 2020

(87) PCT Pub. No.: WO2019/156124
PCT Pub. Date: Aug. 15, 2019

(65) Prior Publication Data
US 2021/0032558 A1 Feb. 4, 2021

(30) Foreign Application Priority Data

Feb. 7, 2018 (JP) .............................. JP2018-019949
Mar. 27, 2018 (JP) .............................. JP2018-059574

(51) Int. Cl.
*C10M 137/10* (2006.01)
*C09K 5/04* (2006.01)
(Continued)

(52) U.S. Cl.
CPC ......... *C10M 137/105* (2013.01); *C09K 5/041* (2013.01); *C10M 105/34* (2013.01);
(Continued)

(58) Field of Classification Search
CPC ... C09K 5/041; C10M 137/04; C10M 169/04; C10M 2203/003; C10M 2223/047;
(Continued)

(56) References Cited

U.S. PATENT DOCUMENTS 4,946,608 A 8/1990 Segaud
2002/0193262 A1 12/2002 Kaimai et al.
(Continued)

FOREIGN PATENT DOCUMENTS

CN 101568626 10/2009
CN 102844417 12/2012
(Continued)

OTHER PUBLICATIONS

ISR issued in WIPO Patent Application No. PCT/JP2019/004261, Apr. 2, 2019, English translation.
(Continued)

*Primary Examiner* — Prem G Singh
*Assistant Examiner* — Francis C Campanell
(74) *Attorney, Agent, or Firm* — Greenblum & Bernstein, P.L.C.

(57) ABSTRACT

One aspect of the present invention is a refrigerating machine oil containing: a base oil containing an ester of an alcohol and a fatty acid; a compound represented by the following formula (1):

(Continued)

wherein $R^1$ and $R^2$ each independently represent a monovalent hydrocarbon group, $R^3$ represents a divalent hydrocarbon group, and $R^4$ represents hydrogen atom or a monovalent hydrocarbon group, and the refrigerating machine oil having a kinematic viscosity at 40° C. of 10 mm²/s or less.

6 Claims, 1 Drawing Sheet

(51) Int. Cl.
*C10M 105/34* (2006.01)
*C10M 105/38* (2006.01)
*C10M 169/04* (2006.01)
*C10N 20/00* (2006.01)
*C10N 30/02* (2006.01)
*C10N 30/06* (2006.01)
*C10N 40/30* (2006.01)

(52) U.S. Cl.
CPC ........ *C10M 105/38* (2013.01); *C10M 169/04* (2013.01); *C10M 2207/345* (2013.01); *C10M 2223/047* (2013.01); *C10N 2020/071* (2020.05); *C10N 2030/02* (2013.01); *C10N 2030/06* (2013.01); *C10N 2040/30* (2013.01)

(58) Field of Classification Search
CPC ............. C10M 171/008; C10M 137/10; F25B 31/002; F25B 2500/16; F25B 1/00; C10N 2030/02; C10N 2030/06; C10N 2040/30; C10N 2020/103; C10N 2020/02
USPC ............................................ 508/329; 252/68
See application file for complete search history.

(56) References Cited

U.S. PATENT DOCUMENTS

| | | | |
|---|---|---|---|
| 2010/0105590 A1* | 4/2010 | Nagakari | C10M 141/00 508/508 |
| 2017/0327763 A1 | 11/2017 | Takahashi et al. | |
| 2017/0335232 A1 | 11/2017 | Kaneko | |
| 2018/0282649 A1* | 10/2018 | Kaneko | C10M 107/34 |

FOREIGN PATENT DOCUMENTS

| | | |
|---|---|---|
| CN | 104119998 | 10/2014 |
| CN | 107001967 | 8/2017 |
| JP | H5-070785 A | 3/1993 |
| JP | H6-009978 A | 1/1994 |
| JP | H8-259978 | 10/1996 |
| JP | 2005-146010 A | 6/2005 |
| JP | 2009-235226 A | 10/2009 |
| JP | 2018-095792 A | 6/2018 |
| WO | 2006/062245 A1 | 6/2006 |
| WO | 2016/072296 A1 | 5/2016 |
| WO | 2017/061601 | 4/2017 |

OTHER PUBLICATIONS

IPRP issued in WIPO Patent Application No. PCT/JP2019/004261, mailed Aug. 20, 2020, English translation.
ISR issued in WIPO Patent Application No. PCT/JP2019/004265, dated Mar. 26, 2019, English translation.
IPRP issued in WIPO Patent Application No. PCT/JP2019/004265, mailed Aug. 20, 2020, English translation.
Office Action issued in CN Patent Application No. 201980010938.2, dated Nov. 2, 2021, partial English translation.
Office Action issued in U.S. Appl. No. 16/967,250, dated Jun. 25, 2021.
Office Action issued in U.S. Appl. No. 16/967,250, dated Jan. 24, 2022.

* cited by examiner

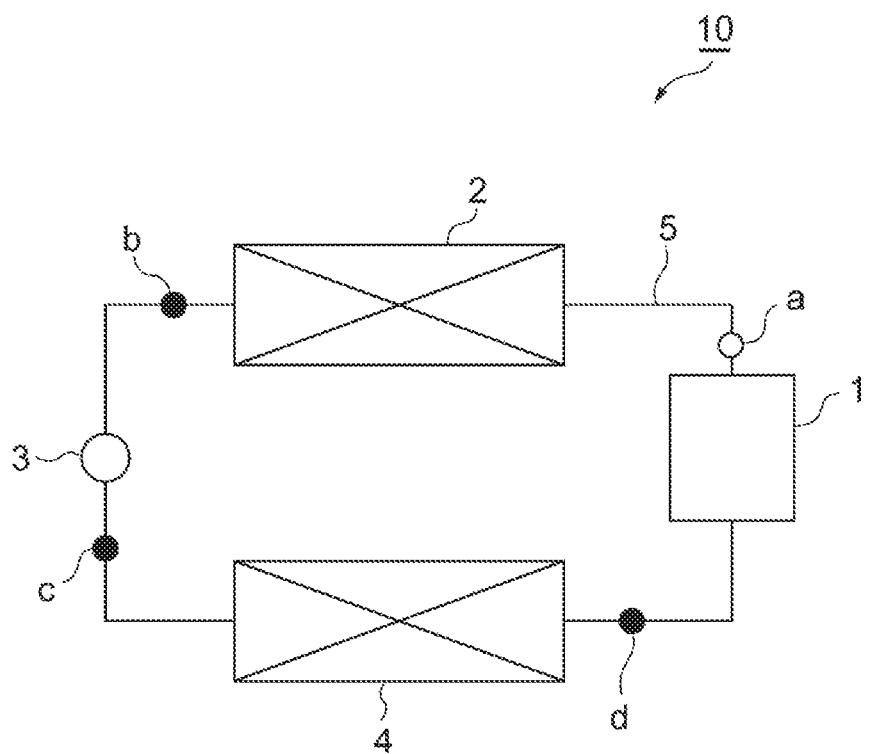

REFRIGERATOR OIL AND HYDRAULIC FLUID COMPOSITION FOR REFRIGERATORS

TECHNICAL FIELD

The present invention relates to a refrigerating machine oil and a working fluid composition for a refrigerating machine.

BACKGROUND ART

A refrigerating machine such as a refrigerator or an air conditioner includes a compressor for circulating a refrigerant in a refrigerant circulation system. The compressor is filled with refrigerating machine oil for lubricating the sliding members. In general, the lower the viscosity of the refrigerating machine oil is, the more stirring resistance and friction of the sliding portion can be reduced. Therefore, the reduction of the viscosity of the refrigerating machine oil leads to energy saving of the refrigerating machine. Patent Document 1 discloses, for example, a refrigerating machine oil having VG3 or more and VG8 or less.

CITATION LIST

Patent Literature

[Patent Document 1] WO 2006/062245

SUMMARY OF INVENTION

Technical Problem

However, when the viscosity of the refrigerating machine oil is low, it is difficult to hold the oil film in the sliding portion, and thus, for example, seizure resistance may not be maintained. Therefore, an additive for improving seizure resistance is added to the refrigerating machine oil. On the other hand, since such an additive may reduce the stability of the refrigerating machine oil, the amount of the additive added is desirably as small as possible. That is, there is a demand for a refrigerating machine oil capable of obtaining a greater effect of improving seizure resistance when the same amount of additive is added.

Therefore, an object of the present invention is to obtain a great effect of improving seizure resistance in a low-viscosity refrigerating machine oil.

Solution to Problem

One aspect of the present invention is a refrigerating machine oil comprising: a base oil comprising an ester of an alcohol and a fatty acid; a compound represented by the following formula (1):

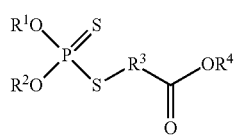

(1)

wherein $R^1$ and $R^2$ each independently represent a monovalent hydrocarbon group, $R^3$ represents a divalent hydrocarbon group, and $R^4$ represents hydrogen atom or a monovalent hydrocarbon group, and the refrigerating machine oil having a kinematic viscosity at 40° C. of 10 mm²/s or less.

Another aspect of the present invention is a working fluid composition for a refrigerating machine comprising: a refrigerating machine oil; and a refrigerant, wherein the refrigerating machine oil comprises: a base oil comprising an ester of an alcohol and a fatty acid; a compound represented by the following formula (1):

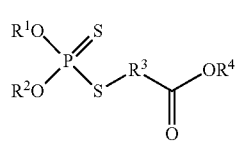

(1)

wherein $R^1$ and $R^2$ each independently represent a monovalent hydrocarbon group, $R^3$ represents a divalent hydrocarbon group, and $R^4$ represents hydrogen atom or a monovalent hydrocarbon group, and wherein the refrigerating machine oil has a kinematic viscosity at 40° C. of 10 mm²/s or less.

The alcohol preferably comprises at least one selected from the group consisting of a monohydric alcohol and a dihydric alcohol. The fatty acid preferably comprises a branched fatty acid. In these cases, a greater effect of improving seizure resistance can be obtained.

The base oil may have a nonpolar index of 60 or less.

Advantageous Effects of Invention

According to the present invention, a great effect of improving seizure resistance can be obtained in a low-viscosity refrigerating machine oil.

BRIEF DESCRIPTION OF DRAWINGS

FIG. 1 is a schematic diagram showing an example of the configuration of a refrigerating machine.

DESCRIPTION OF EMBODIMENTS

Hereinafter, embodiments of the present invention will be described in detail.

A refrigerating machine oil according to an embodiment contains a base oil containing an ester of an alcohol and a fatty acid. The alcohol may be an aliphatic alcohol. The aliphatic alcohol may be linear or branched. The number of carbon atoms of the alcohol may be, for example, 3 or more, 4 or more, or 5 or more, and may be 12 or less, 10 or less, or 8 or less.

From the viewpoint of obtaining a greater effect of improving seizure resistance, the alcohol preferably includes at least one selected from the group consisting of a monohydric alcohol and a dihydric alcohol, and more preferably includes at least one selected from the group consisting of a monohydric aliphatic alcohol and a dihydric aliphatic alcohol.

The ratio of the monohydric alcohol and the dihydric alcohol (total) in the alcohol may be 50% by mass or more, 70% by mass or more, or 90% by mass or more. The ratio (total) of the monohydric aliphatic alcohol and the dihydric aliphatic alcohol (total) in the alcohol may be 50% by mass or more, 70% by mass or more, or 90% by mass or more. The alcohol may consist of at least one selected from the group consisting of the monohydric alcohol and the dihydric alcohol, or may consist of at least one selected from the group consisting of the monohydric aliphatic alcohol and the dihydric aliphatic alcohol.

Examples of the monohydric aliphatic alcohol include propanol, butanol, pentanol, hexanol, heptanol, octanol, nonanol, decanol, undecanol, and dodecanol. These monohydric aliphatic alcohols may be linear or branched.

Examples of the dihydric aliphatic alcohol include 1,3-propanediol, propylene glycol, 1,4-butanediol, 1,2-butanediol, 2-methyl-1,3-propanediol, 1,5-pentanedial, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

The number of carbon atoms of the fatty acid may be, for example, 4 or more, 5 or more, or 6 or more, and may be 20 or less, 15 Or less, or 10 or less. The fatty acid may include a linear fatty acid, may include a branched fatty acid, and preferably includes a branched fatty acid from the viewpoint of obtaining a greater effect of improving seizure resistance.

The fatty acid preferably includes at least one selected from the group consisting of a linear fatty acid having 4 to 12 carbon atoms and a branched fatty acid having 4 to 12 carbon atoms, and more preferably includes at least one selected from the group consisting of a branched fatty acid having 6 to 8 carbon atoms, from the viewpoint of reducing the viscosity and obtaining a greater effect of improving seizure resistance. Such a fatty acid may be, for example, n-hexanoic acid, n-heptanoic acid, n-octanoic acid, 2-methylpentanoic acid, 2-ethylbutanoic acid, 2-methylhexanoic acid, or 2-ethylhexanoic acid.

The proportion of the linear fatty acid having 4 to 10 carbon atoms and the branched fatty acid having 4 to 10 carbon atoms (total) in the fatty acid may be 50% by mass or more, 70% by mass or more, or 90% by mass or more. The proportion of the branched fatty acid having 6 to 8 carbon atoms (total) in the fatty acid may be 50% by mass or more, 70% by mass or more, or 90% by mass or more. The fatty acid may consist of at least one selected from the group consisting of a linear fatty acid having 4 to 10 carbon atoms and a branched fatty acid having 4 to 10 carbon atoms, or may consist of at least one selected from the group consisting of a branched fatty acid having 6 to 8 carbon atoms.

The ester may include only an ester of a monohydric alcohol (preferably a monohydric aliphatic alcohol) and a fatty acid, may include only an ester of a dihydric alcohol (preferably a dihydric aliphatic alcohol) and a fatty acid, or may include only an ester of a monohydric alcohol (preferably a monohydric aliphatic alcohol) and a fatty acid and an ester of a dihydric alcohol (preferably a dihydric aliphatic alcohol) and a flatly acid, from the viewpoint of obtaining a greater effect of improving seizing resistance.

The kinematic viscosity at 40° C. of the base oil may be, for example, 1 mm$^2$/s or more, 1.5 mm$^2$/s or more, or 2 mm$^2$/s or more, and, from the viewpoint of Obtaining a greater effect of improving seizure resistance and also excellent antiwear property (reducing the amount of wear), is preferably 10 mm$^2$/s or less, 9 mm$^2$/s or less, or 8 mm$^2$/s or less. The kinematic viscosity at 100° C. of the base oil may be, for example, 0.5 mm$^2$/s or more, 1 mm$^2$/s or more, or 1.5 mm$^2$/s or more, and, from the viewpoint of obtaining a greater effect of improving seizure resistance and excellent antiwear property (reducing the amount of wear), is preferably 8 mm$^2$/s or less, 5 mm$^2$/s or less, or 2.5 mm$^2$/s or less.

The kinematic viscosity in the present specification means kinematic viscosity measured in accordance with JIS K 2283:2000.

The nonpolar index of the base oil is preferably 60 or less, and may be 55 or less, 50 or less, 45 or less, or 40 or less, and may be 20 or more, 30 or more, or 35 or more. When a fatty acid ester having a non-polar index of 60 or less is used, the effect of improving antiwear property or seizure resistance by the compound represented by the formula (1) (improvement rate) is further enhanced as compared with the case of using a fatty acid ester having a non-polar index of more than 60. In addition, the effect of improving antiwear property or seizure resistance by the compound represented by the formula (1) (improvement rate) tends to be higher when the branched fatty acid ester is used as the base oil than when the linear fatty acid ester is used as the base oil. The nonpolar index of the fatty acid ester is calculated according to the following formula:

Non-polar index=(number of carbon atoms×molecular weight)/(number of ester groups×100)  (A)

In the formula (A), the number of carbon atoms represents the number of carbon atoms constituting the fatty acid ester, the molecular weight represents the molecular weight of the fatty acid ester, and the number of ester groups represents the number of ester groups of one fatty acid ester molecule.

The base oil may further contain another known base oils in addition to the ester. The content of the ester may be 50% by mass or more, 70% by mass or more, or 90% by mass or more, based on the total amount of the base oil. The base oil may consist of the ester.

The content of the base oil may be 50% by mass or more, 60% by mass or more, 70% by mass or more, 80% by mass or more, 90% by mass or more, or 95% by mass or more, and may be 99.5% by mass or less, 99% by mass or less, or 98.5% by mass or less, based on the total amount of the refrigerating machine oil.

The refrigerating machine oil further contains a compound represented by the following formula (1):

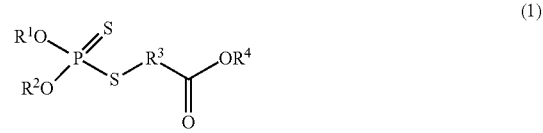

In the formula (1), $R^1$ and $R^2$ each independently represent a monovalent hydrocarbon group. Examples of the divalent hydrocarbon group include an alkyl group and an aryl group. The number of carbon atoms of the divalent hydrocarbon group represented by $R^1$ and $R^2$ each independently may be 1 or more, 2 or more, or 3 or more, and may be 10 or less, 9 or less, or 8 or less. The total number of carbon atoms of the divalent hydrocarbon group represented by $R^1$ and $R^2$ may be 2 or more, 3 or more, or 4 or more, and may be 20 or less, 19 or less, or 18 or less.

In the formula (1), $R^3$ represents a divalent hydrocarbon group. Examples of the divalent hydrocarbon group include an alkylene group. The number of carbon atoms of the divalent hydrocarbon group represented by $R^3$ may be 1 or more, 2 or more, or 3 or more, and may be 10 or less, 9 or less, or 8 or less.

In the formula (1), $R^4$ represents hydrogen atom or a monovalent hydrocarbon group. Examples of the monovalent hydrocarbon group include an alkyl group. The number of carbon atoms of the monovalent hydrocarbon group represented by $R^4$ may be 1 or more, 2 or more, or 3 or more, and may be 10 or less, 9 or less, or 8 or less.

The compound represented by the formula (1) is preferably a compound represented by the following formula (2):

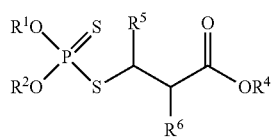

(2)

In the formula (2), $R^1$, $R^2$ and $R^4$ have the same meanings as $R^1$, $R^2$ and $R^4$ in the formula (1), respectively. $R^5$ and $R^6$ each independently represent hydrogen atom or an alkyl group. The alkyl group may be linear or branched, and is preferably linear. The number of carbon atoms of the alkyl group may be, for example, 1 to 4 1 to 3, or 1 to 2. At least one of $R^5$ and $R^6$ is preferably hydrogen atom. More preferably, one of $R^5$ and $R^6$ is an alkyl group and the other is hydrogen atom.

Specific examples of such compounds include 3-(diisobutoxy-thiopholylsulfanyl)-2-methyl-propionic acid, ethyl-3-[[bis(1-methylethoxy)phosphinothioyl]thio] propionate, 3-(O,O-diisopropyl-dithiophosphoryl)-propionic acid, 3-(O,O-diisopropyl-dithiophosphoryl)-2-methyl-propionic acid, 3-(O,O-diisobutyl-dithiophosphoryl)-propionic acid, 3-(O,O-diisobutyl-dithophosphoryl)-2-methyl-propionic acid, and alkyl esters such as ethyl esters of these compounds.

The content of the compound represented by the formula (1) is preferably 0.001% by mass or more, more preferably 0.005% by mass or more, and still more preferably 0.01% by mass or more, based on the total amount of the refrigerating machine oil, from the viewpoint of further improving seizure resistance. The content of the compound represented by the formula (1) is preferably 5% by mass or less, more preferably 4% by mass or less, and still more preferably 3% by mass or less, based on the total amount of the refrigerating machine oil, from the viewpoint of improving stability. The content of the compound represented by the formula (1) is preferably 0.001 to 5% by mass, 0.001 to 4% by mass, 0.001 to 3% by mass, 0.005 to 5% by mass, 0.005 to 4% by mass, 0.005 to by mass, 0.01 to 5% by mass, 0.01 to 4% by mass, or 0.01 to 3% by mass, from the viewpoint of further improving seizure resistance and improving stability.

The content of the compound represented by the formula (1) may be 1% by mass or less, 0.1% by mass or less, 0.06% by mass or less, or 0.04% by mass or less, and may be 0.001 to 1% by mass, 0.001 to 0.1% by mass, 0.001 to 0.06% by mass, 0.001 to 0.04% by mass, 0.005 to 1% by mass, 0.005 to 0.1% by mass, 0.005 to 0.06% by mass, 0.005 to 0.04% by mass, 0.01 to 1% by mass, 0.01 to 0.1% by mass, 0.01 to 0.06% by mass, or 0.01 to 0.04% by mass, based on the total amount of the refrigerating machine oil, from the viewpoint of obtaining a refrigerating machine oil having excellent stability by suppressing the initial oxidation to a low level, and further improving the effect when a phosphorus-based extreme pressure agent (described in detail later) other than the compound represented by formula (1) is further included in combination.

The refrigerating machine oil according to the present embodiment may further contain a phosphorus-based extreme pressure agent other than the compound represented by the formula (1). The phosphorus-based extreme pressure agent may contain phosphorus in the molecule. Examples of the phosphorus-based extreme pressure agent include phosphoric esters, acidic phosphoric esters, amine salts of acidic phosphoric esters, chlorinated phosphoric esters, phosphorous esters, and thiophosphoric esters.

Examples of the phosphoric esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, nitetradecyl phosphate, tripentadecyl phosphate, trihexadecyl phosphate, triheptadecyl phosphate, trioctadecyl phosphate, trioleyl phosphate, triphenyl phosphate, tricresyl phosphate, tri-(ethylphenyl) phosphate, tri-(propylphenyl) phosphate, tri-(butylphertyl) phosphate, trixylenyl phosphate, cresyldiphenyl phosphate, and xylenyldiphenyl phosphate. The phosphoric ester is preferably triphenyl phosphate or tricresyl phosphate.

Examples of the acidic phosphoric esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Examples of the amine salts of acidic phosphoric esters include salts of the above-described acidic phosphoric esters with amines such as methylamine, ethylamine, propylamine, butylamine, pentylamine, hexylamine, heptylamine, octylamine, dimethylamine, diethylamine, dipropylamine, dibutylamine, dipentylarnine, dihexylamine, diheptylamine, dioctylamine, trimethylamine, triethylamine, tripropylamine, tributyamine, tripentylamine, trihexylamine, triheptylamine and trioctyl amine.

Examples of the chlorinated phosphoric esters include tris-(dichloropropyl) phosphate, tris-(chloroethyl) phosphate, tris-(chlorophenyl) phosphate and polyoxyalkylene-bis-[di(chloroalkyl)] phosphate. Examples of the phosphorous esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

Examples of the thiophosphoric ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate and xylenyldiphenyl phosphorothionate. The thiophosphoric ester is preferably triphenyl phosphorothionate.

The content of the phosphorus-based extreme pressure agent may be, for example, 0.1% by mass or more, 1% by mass or more, 1.5% by mass or more, or 1.6% by mass or more, and may be, for example, 5% by mass or less, 3% by mass or less, 2.5% by mass or less, or 2% by mass or less, based on the total amount of the refrigerating machine oil, from the viewpoint of further improving seizure resistance.

When the refrigerating machine oil further contains a phosphorus-based extreme pressure agent, the ratio of the content of the compound represented by the formula (1) to the content of the phosphorus based extreme pressure agent (mass ratio, the compound represented by the formula (1)/the phosphorus-based extreme pressure agent) may be 0.0001/1 or more, 0.0002/1 or more, or 0.0005/1 or more, and may be 1/1 or less, 0.5/1 or less, 0.1/1 or less, 0.05/1 or less, or 0.01/1 or less.

The kinematic viscosity at 40° C. of the refrigerating machine oil may be, for example, 1 mm$^2$/s or more, 1.5 mm$^2$/s or more, or 2 mm$^2$/s or more, and, from the viewpoint of Obtaining a greater effect of improving seizure resistance and excellent antiwear property (reducing the amount of wear) is preferably 10 mm$^2$/s or less, 9 mm$^2$/s or less, or 8 mm$^2$/s or less. The kinematic viscosity at 100° C. of the refrigerating machine oil may be, for example, 0.5 mm$^2$/s or more, 1 mm$^2$/s or more, or 1.5 mm$^2$/s or more, and, from the viewpoint of obtaining a greater effect of improving seizure resistance and excellent antiwear property (reducing the amount of wear) is preferably 8 mm$^2$/s or less, 5 mm$^2$/s or less, or 2.5 mm2/s or less.

The ISO viscosity classification of the refrigerating machine oil is not particularly limited as long as the kinematic viscosity at 40° C. of the refrigerating machine oil is 10 mm$^2$/s or less. The ISO viscosity classification of the refrigerating machine oil is classified into, for example, VG2, VG3, VG5, VG7 or VG10. From the viewpoint of securing low friction properties in the fluid lubrication region, the ISO viscosity classification is preferably VG10 or less, more preferably VG7 or less, and still more preferably VG5 or less. For example, in the case of a refrigerating machine oil of VG7 or VG5, although the friction coefficient in the fluid lubrication region is generally lower than that of a refrigerating machine oil of a higher viscosity grade, the lubricity in the mixed lubrication or boundary lubrication region tends to deteriorate and the friction coefficient tends to increase. However, by adding the compound represented by the formula (1) in the present invention, the lubricity in the mixed lubrication region or the boundary lubrication region is remarkably improved, thereby contributing to the low friction property. This improvement degree is higher in the refrigerating machine oil of VG10 or lower. The ISO viscosity classification as used herein means a viscosity grade defined in JIS K 2001 (1993) "Industrial Lubricant-ISO Viscosity Classification" or ISO 3448-1992 "Industrial Liquid Lubricant-ISO Viscosity Classification".

The flash point of the refrigerating machine oil may be 100° C. or higher, 110° C. or higher, or 120° C. or higher, from the viewpoint of safety, and may be 155° C. or lower, or 145° C. or lower, from the viewpoint of decreasing the viscosity. The flash point in the present specification means flash point measured in accordance with JIS K 2265-4:2007 (Cleveland open cup (COC) method).

The pour point of the refrigerating machine oil may be −10° C. or lower, −20° C. or lower, or −50° C. or lower, and may be −40° C. or higher from the viewpoint of purification cost. The pour point in the present specification means pour point measured in accordance with JIS K 2269:1987.

The acid value of the refrigerating machine oil may be 1.0 mgKOH/g or less, or 0.1 mgKOH/g or less. The acid value in the present specification means acid value measured in accordance with JIS K 2501:2003.

The volume resistivity the refrigerating machine oil may be $10\times10^9$ Ω·m or more, $1.0\times10^{10}$ Ω·m or more, or $1.0\times10^{11}$ Ω·cm or more. The volume resistivity in the present invention means volume resistivity at 25° C. measured in accordance with JIS C 2101:1999.

The moisture content of the refrigerating machine oil may be 200 ppm or less, 100 ppm or less, or 50 ppm or less, based on the total amount of the refrigerating machine oil.

The ash content of the refrigerating machine oil may be 100 ppm or less, or 50 ppm or less. The ash content in the present invention means ash content measured in accordance with JIS K 2272:1998.

The refrigerating machine oil is present in a state of being mixed with a refrigerant to be a working fluid composition for a refrigerating machine, in the refrigerating machine. That is, the refrigerating machine oil is used together with a refrigerant, and the working fluid composition for a refrigerating machine contains the refrigerating machine oil and the refrigerant. The content of the refrigerating machine oil in the working fluid composition for a refrigerating machine may be 1 part by mass or more or 2 parts by mass or more, and may be 500 parts by mass or less or 400 parts by mass or less, based on 100 parts by mass of the refrigerant.

Examples of the refrigerant include hydrocarbon refrigerants, saturated hydrofluorocarbon refrigerants, unsaturated hydrofluorocarbon refrigerants, fluorine-containing ether refrigerants such as perfluoroethers, bis-(trifluoromethyl) sulfide refrigerants, difluoroiodomethane refrigerants, and natural refrigerants such as ammonia and carbon dioxide.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. The hydrocarbon refrigerant is preferably a hydrocarbon refrigerant that is gaseous at 25° C. and 1 atm., and is more preferably propane, n-butane, isobutane, 2-methylbutane, or a mixture thereof.

The saturated hydrofluorocarbon refrigerant is preferably a saturated hydrofluorocarbon having 1 to 3 carbon atoms, more preferably 1 to 2 carbon atoms. Specific examples of the saturated hydrofluorocarbon refrigerant include difluoromethane (R32), trifluoromethane pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of 2 or more thereof.

The saturated hydrofluorocarbon refrigerant is appropriately selected from the above-mentioned refrigerants according to the use and required performance. The saturated hydrofluorocarbon refrigerant is, for example, R32 alone; R23 alone; R134a alone; R125 alone; a mixture of R134a/R32=60 to 80% by mass/40 to 20% by mass; a mixture of R32/R125=40 to 70% by mass/60 to 30% by mass; a mixture of R125/R143a=40 to 60% by mass/60 to 40% by mass; a mixture of R134a/R32/R125=60% by mass/30% by mass/10% by mass; a mixture of R134a/R32/ R125=40 to 70% by mass/15 to 35% by mass/5 to 40% by mass; and a mixture of R125/R134a/R143a=35 to 55% by mass/1 to 15% by mass/40 to 60% by mass. More specifically, the saturated hydrofluorocarbon refrigerant may be a mixture of R134a/R32=70/30% by mass; R32/R125=60/ 40% by mass; R32/R125=50/50% by mass (R410A); R32/ R125=45/55% by mass (R410B); R125/R143a=50/50% by mass (R507C); R32/R125/R134a=30/10/60% by mass; R32/ R125/R134a=23/25/52% by mass (R407C); and R32/R125/ R134a=25/15/60% by mass (R407E); R125/R134a/ R143a=44/4/52% by mass (R404A).

The unsaturated hydrofluorocarbon refrigerant is preferably an unsaturated hydrofluorocarbon having 2 to 3 carbon atoms, more preferably fluoropropene, and still more preferably fluoropropene having 3 to 5 fluorine atoms. The unsaturated hydrofluorocarbon refrigerant is preferably any one of 1,2,3,3,3-pentafluoropropene (HFO)-1225ye), 1,3,3, 3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more of these. The unsaturated hydrofluorocarbon refrigerant is preferably one or two or more selected from HFO-1225ye, HFO-1234ze and HFO-1234yf, from the viewpoint of refrigerant physical properties. The unsaturated hydrofluorocarbon refrigerant may be fluoroethylene, and is preferably 1,1,2,3-trifluoroethylene.

The refrigerating machine oil and the working fluid composition for a refrigerating machine according to the present embodiment are suitably used for a refrigerating machine such as an air conditioner having a reciprocating or rotary hermetic compressor, a refrigerating machine, an open or hermetic car air conditioner, a dehumidifier, a water heater, a freezer, a freezing and refrigerating warehouse, an automatic vending machine, a showcase, or a chemical plant, a refrigerating machine having a centrifugal compressor, or the like.

FIG. 1 is a schematic view showing an example of the configuration of a refrigerating machine to which the refrigerating machine oil and the working fluid composition for a refrigerating machine according to the present embodiment are applied. As shown in FIG. 1, the refrigerating machine 10 includes at least a refrigerant circulation system in which, for example, a refrigerant compressor 1, a gas cooler 2, an expansion mechanism 3 (a capillary, an expansion valve, or the like), and an evaporator 4 are sequentially connected by a flow path 5. In such a refrigerant circulation system, first, a high-temperature (usually 70 to 120° C.) refrigerant discharged from the refrigerant compressor 1 into the flow path 5 becomes a high-density fluid (supercritical fluid or the like) in the gas cooler 2. Subsequently, the refrigerant is liquefied by passing through a narrow flow path of the expansion mechanism 3, and is further vaporized in the evaporator 4 to have a low temperature (usually −40 to 0° C.).

In the refrigerant compressor 1 in FIG. 1, a small amount of refrigerant and a large amount of refrigerating machine oil coexist under high temperature conditions (usually 70 to 120° C.). The refrigerant discharged from the refrigerant compressor 1 to the flow path 5 is in a gaseous state and contains a small amount (usually 1 to 10%) of the refrigeration machine oil as a mist, and a small amount of the refrigerant is dissolved in the mist-like refrigeration machine oil (point a in FIG. 1). Next, in the gas cooler 2, the gaseous refrigerant is compressed into a high-density fluid, and a large amount of refrigerant and a small amount of refrigerating machine oil coexist under relatively high temperature conditions (around 50 to 70° C.) (point b in FIG. 1). Further, the mixture of a large amount of refrigerant and a small amount of refrigerating machine oil is sent to the expansion mechanism 3 and the evaporator 4 in this order to rapidly reach a low temperature (usually −40 to 0° C.) (points c and d in FIG. 1), and is returned to the refrigerant compressor 1 again.

The refrigerating machine oil according to the present embodiment can be used together with the above-described refrigerant, but is particularly suitably used together with a hydrocarbon refrigerant in terms of the cooling temperature characteristics and compatibility at the time of refrigerant mixing. From the same viewpoint, the working fluid composition for a refrigerating machine particularly preferably contains a hydrocarbon refrigerant.

EXAMPLES

Hereinafter, the present invention will be described more specifically based on Examples, but the present invention is not limited to Examples.

Refrigerating machine oils having a composition shown in Tables 1 to 4 (% by mass based on the total amount of the base oil for the base oil, and % by mass based on the total amount of the refrigerating machine oil for the refrigerating machine oil) were prepared using each component shown below. In all of the refrigerating machine oils of Examples, Comparative Examples, and Reference Examples, 0.1% by mass of 2,6-di-tert-butyl-p-cresol and 0.3% by mass of glycidyl neodecanoate were added.
(Base Oil)
A1: ester of neopentyl glycol and n-octanoic acid (kinematic viscosity at 40° C.: 7.4 mm$^2$/s, non-polar index: 38.5)
A2: ester of neopentyl glycol and 2-ethylhexanoic acid (kinematic viscosity at 40° C.: 7.5 mm$^2$/s, nonpolar index: 38.5)
A3: ester of 2-ethylhexanol and 2-ethylhexanoic acid (kinematic viscosity at 40° C.: 2.7 mm$^2$/s, nonpolar index: 41)
a1: ester of pentaerithritol and mixed fatty acids of 2-ethylhexanoic acid/3,5,5-trimethylhexanoic acid (mass ratio: 50/50) (kinematic viscosity at 40° C.: 67.4 mm$^2$/s, nonpolar index: 65)
(Additive)
B1: 3-(diisobutoxy-thiophosphorylsulfanyl)-2-methyl-propionic acid (compound represented by the following formula (3):

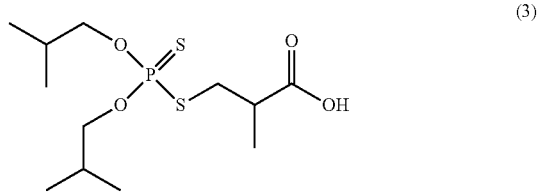 [SMILES: CC(C)COP(=S)(OCC(C)C)SCC(C)C(=O)O]

(3)

C1: tricresyl phosphate

The seizure resistance of each of the refrigerating machine oils of Examples, Comparative Examples, and Reference Examples was evaluated by the following procedure. The results are shown in Tables 1 to 4.
(Evaluation of Seizure Resistance)
FALEX Pin/Vee-Block testing was performed. Under the conditions of the number of revolutions: 290 rpm, the temperature: 60° C., the oil amount: 120 mL, and the air atmosphere, the running-in operation was performed for 5 minutes under the load of 300 lbf, and then the load was applied, and the load (lbf) at the time when the seizure occurred was defined as the seizure load. ASTM standard specimens were used as test specimens. The seizure load in the case of containing the additive B1 and/or the additive C1 was determined as relative values when the seizure load in the case of not containing the additive B1 and the additive C1 (Comparative Example 1, Comparative Example 2-1, Comparative Example 3-1, or Reference Example 2) was set to 100. A greater value of the seizure load means a greater effect of improving the seizure resistance.

TABLE 1

|  |  | Example 1 | Comparative Example 1 |
|---|---|---|---|
| Composition of base oil | A1 | 100 | 100 |
| Composition of refrigerating machine oil | Base oil | Balance | Balance |
|  | B1 | 0.03 | — |
|  | C1 | — | — |
| Kinematic viscosity of refrigerating machine oil (mm²/s) | 40° C. | 7.0 | 7.0 |
|  | 100° C. | 2.2 | 2.2 |
| Seizure resistance |  | 108 | 100 |

TABLE 2

|  |  | Example 2-1 | Example 2-2 | Comparative Example 2-1 | Comparative Example 2-2 |
|---|---|---|---|---|---|
| Composition of base oil | A2 | 100 | 100 | 100 | 100 |
| Composition of refrigerating machine oil | Base oil | Balance | Balance | Balance | Balance |
|  | B1 | 0.03 | 0.03 | — | — |
|  | C1 | — | 1.5 | — | 1.5 |
| Kinematic viscosity of refrigerating machine oil (mm²/s) | 40° C. | 7.5 | 7.7 | 7.5 | 7.7 |
|  | 100° C. | 2.2 | 2.3 | 2.2 | 2.3 |
| Seizure resistance |  | 116 | 125 | 100 | 105 |

TABLE 3

|  |  | Example 3 | Comparative Example 3-1 | Comparative Example 3-2 |
|---|---|---|---|---|
| Composition of base oil | A2 | 70 | 70 | 70 |
|  | A3 | 30 | 30 | 30 |
| Composition of refrigerating machine oil | Base oil | Balance | Balance | Balance |
|  | B1 | 0.03 | — | — |
|  | C1 | — | — | 1.5 |
| Kinematic viscosity of refrigerating machine oil (mm²/s) | 40° C. | 5.2 | 5.2 | 5.4 |
|  | 100° C. | 1.7 | 1.7 | 1.8 |
| Seizure resistance |  | 156 | 100 | 121 |

TABLE 4

|  |  | Reference Example 1 | Reference Example 2 |
|---|---|---|---|
| Composition of base oil | a1 | 100 | 100 |
| Composition of refrigerating machine oil | Base oil | Balance | Balance |
|  | B1 | 0.03 | — |
|  | C1 | — | — |
| Kinematic viscosity of refrigerating machine oil (mm²/s) | 40° C. | 67.3 | 67.4 |
|  | 100° C. | 8.3 | 8.3 |
| Seizure resistance |  | 105 | 100 |

As shown in Examples 1, 24, 2-2 and 3, it was confirmed that in the case of a low-viscosity refrigerating machine oil, a great effect of improving the seizure resistance was obtained by adding the compound represented by the formula (1). On the other hand, as shown in Reference Examples 1 and 2, it was confirmed that in the case where the refrigerating machine oil was not a low-viscosity refrigerating machine oil, even when the compound represented by the formula (1) was added, the effect of improving the seizure resistance was small as compared with the case of the low-viscosity refrigerating machine oil.

With respect to each of the refrigerating machine oils of Examples 2-1, 2-2 and 3, Comparative Examples 2-1, 2-2, 3-1 and 3-2, and Reference Examples 1 and 2, the antiwear property was also evaluated by the following procedure. The results are shown in Table 5.

(Evaluation of Antiwear Property)

The antiwear property test was performed by a high speed four balls test according to ASTM D 4172-94. SUJ2 was used as the rigid sphere, and the test was performed under the conditions of a test oil amount of 20 mL, a test temperature of 80° C., a rotation speed of 1200 rpm, a load of 196 N, and a test time of 15 minutes. The wear scar diameter (mm) of the fixed ball was measured. The smaller the value of the wear scar diameter, the better the antiwear property.

TABLE 5

|  | Example 2-1 | Example 2-2 | Comp. Example 2-1 | Comp. Example 2-2 |
|---|---|---|---|---|
| Antiwear property (mm) | 0.54 | 0.54 | 0.59 | 0.74 |

|  | Example 3 | Comp. Example 3-1 | Comp. Example 3-2 | Ref. Example 3-1 | Ref. Example 3-2 |
|---|---|---|---|---|---|
| Antiwear property (mm) | 0.53 | 0.58 | 0.68 | 0.79 | 0.76 |

In addition, four refrigerating machine oils were obtained in the same manner as in Example 2-1 or 2-2 except that the content of B1 in the refrigerating machine oil of Example 2-1 or 2-2 was changed to 0.05% by mass or 0.1% by mass. The kinematic viscosity at 40° C. of these refrigerating machine oils was 10 mm²/s or less. These refrigerating machine oils were found to have the same effect of improving seizure resistance and antiwear property as in Examples 2-1 and 2-2, but it was suggested that stability tends to deteriorate as the content of B1 increases.

Further, four refrigerating machine oils were obtained in the same manner as in Example 2-1 or 2-2 except that a compound represented by the following formula (4) was used instead of B1 in the refrigerating machine oil of Example 2-1 or 2-2. The kinematic viscosity at 40° C. of these refrigerating machine oils was 10 mm²/s or less. These refrigerating machine oils were found to have the same effect of improving seizure resistance and antiwear property as in Examples 2-1 and 2-2.

(4)

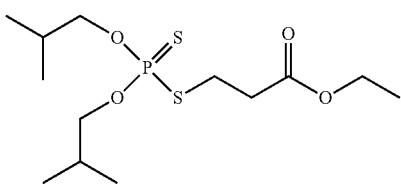

Further, eight refrigerating machine oils were obtained in the same manner as in Example 2-1 or 2-2 except that C1 in the refrigerating machine oil of Example 2-1 or 2-2 was changed to triphenyl phosphate, tri (propylphenyl) phosphate, tri (butylphenyl) phosphate or triphenyl phosphorothionate. The kinematic viscosity at 40° C. of these refrigerating machine oils was 10 mm²/s or less. These refrigerating machine oils were also found to have the same effect of improving seizure resistance and antiwear property as in Examples 2-1 and 2-2.

REFERENCE SIGNS LIST

1: refrigerant compressor, 2: gas cooler, 3: expansion mechanism, 4: evaporator, 5: channel, 10: refrigerating machine.

The invention claimed is:

1. A refrigerating machine oil comprising:
    90% by mass or more based on a total amount of the refrigerating machine oil of a base oil comprising an ester of an alcohol and a fatty acid, wherein the base oil has a nonpolar index of 30 or more and 50 or less; and
    0.001% by mass or more and 0.1% by mass or less based on a total amount of the refrigerating machine oil of a compound represented by the following formula (1):

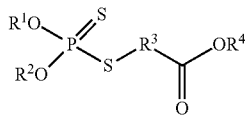

(1)

wherein $R^1$ and $R^2$ each independently represent an alkyl group having 1 to 10 carbon atoms, $R^3$ represents an alkylene group having 1 to 10 carbon atoms, and $R^4$ represents hydrogen atom or an alkyl group having 1 to 10 carbon atoms, wherein the refrigerating machine oil has a kinematic viscosity at 40° C. of 1 mm²/s or more and 10 mm²/s or less.

2. The refrigerating machine oil according to claim 1, wherein the alcohol comprises at least one selected from the group consisting of a monohydric alcohol and a dihydric alcohol.

3. The refrigerating machine oil according to claim 1, wherein the fatty acid comprises a branched fatty acid.

4. A working fluid composition for a refrigerating machine comprising:
    a refrigerating machine oil; and
    a refrigerant,
    wherein the refrigerating machine oil comprises:
    90% by mass or more based on a total amount of the refrigerating machine oil of a base oil comprising an ester of an alcohol and a fatty acid, wherein the base oil has a nonpolar index of 30 or more and 50 or less; and
    0.001% by mass or more and 0.1% by mass or less based on a total amount of the refrigerating machine oil of a compound represented by the following formula (1):

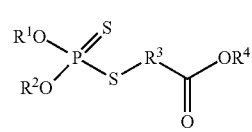

(1)

wherein $R^1$ and $R^2$ each independently represent an alkyl group having 1 to 10 carbon atoms, $R^3$ represents an alkylene group having 1 to 10 carbon atoms, and $R^4$ represents hydrogen atom or an alkyl group having 1 to 10 carbon atoms, wherein the refrigerating machine oil has a kinematic viscosity at 40° C. of 1 mm²/s or more and 10 mm²/s or less.

5. The working fluid composition for a refrigerating machine according to claim 4, wherein the alcohol comprises at least one selected from the group consisting of a monohydric alcohol and a dihydric alcohol.

6. The working fluid composition for a refrigerating machine according to claim 4, wherein the fatty acid comprises a branched fatty acid.

* * * * *